D. W. HUGHES.
HARROW TEETH.

No. 181,173. Patented Aug. 15, 1876.

WITNESSES
Robert Everett
George E. Upham

INVENTOR
David W. Hughes
Gilmore, Smith & Co.
ATTORNEYS

UNITED STATES PATENT OFFICE.

DAVID W. HUGHES, OF ST. LOUIS, MISSOURI.

IMPROVEMENT IN HARROW-TEETH.

Specification forming part of Letters Patent No. 181,173, dated August 15, 1876; application filed February 5, 1876.

*To all whom it may concern:*

Be it known that I, DAVID W. HUGHES, of St. Louis, in the county of St. Louis and State of Missouri, have invented a new and valuable Improvement in Harrow-Teeth; and I do hereby declare that the following is a full, clear, and exact description of the construction and operation of the same, reference being had to the annexed drawings, making a part of this specification, and to the letters and figures of reference marked thereon.

Figure 1:
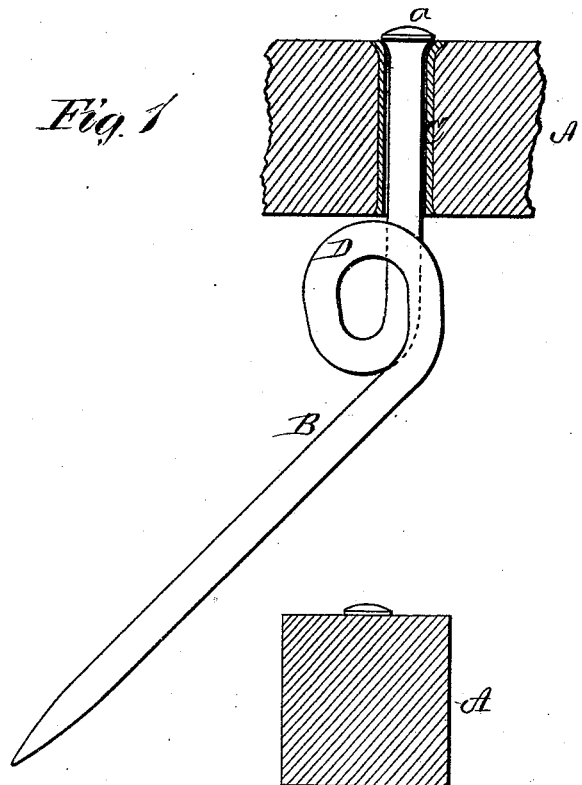
Figure 2:
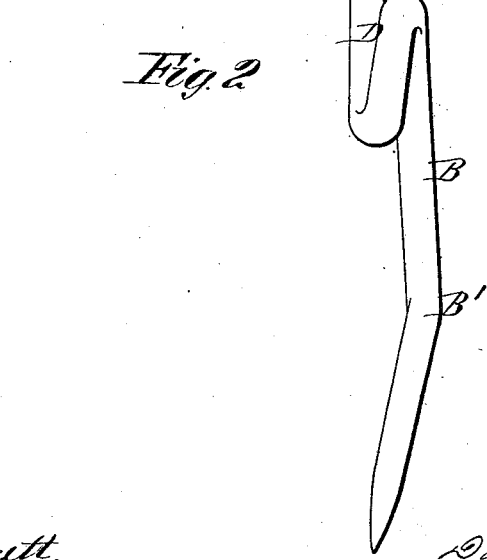

Figures 1 and 2 of the drawings are representations of sectional views of my harrow-tooth.

My invention relates to harrow-teeth; and it consists in a swiveled self-adjusting harrow-tooth, having an elbow near its center and a spiral curve at the top, as will be hereinafter more fully set forth.

In the annexed drawing, A represents the frame, in which the tooth B is swiveled. The upper end of the tooth B is placed within a metal sleeve, C, and the end riveted, as shown at *a*. The tooth and sleeve are then driven into a hole made in the frame, which allows the tooth to turn in either direction. Near the center the tooth B is bent to form an elbow, as shown at B', which causes the tooth to dip at any angle desired while in motion, for the purpose of severing weeds, grass, &c. The elbows are bent right and left, and the teeth arranged alternately in the frame, so the dip of one tooth is crossed by the one following. In the upper part of the tooth, immediately below the sleeve C, is a bend, D, which may be in the form of a spiral, as shown, or otherwise, forming a shoulder or bearing for the frame to rest on. When this bend is made in spiral form, as shown, a spring is thus secured in the tooth.

The tooth thus constructed being held to the frame by means of the sleeve C, yet plays loosely in said sleeve, and turns or adjust itself to the line of draft as drawn along, and especially in turning at corners, which is of great advantage.

I do, however, not claim, broadly, a swiveled harrow-tooth, as I am aware that is not new.

What I claim as new, and desire to secure by Letters Patent, is—

A harrow-tooth, B, bent at or near the center to form an elbow, B', so that the levered part of the tooth will stand at an angle with the upper part, for the purpose herein set forth.

In testimony that I claim the above I have hereunto subscribed my name in the presence of two witnesses.

DAVID W. HUGHES.

Witnesses:
 GEO. O. ATHERTON,
 JOHN T. DOWDALL.